(12) United States Patent
Kitahara

(10) Patent No.: US 8,508,862 B2
(45) Date of Patent: Aug. 13, 2013

(54) IMAGE PICKUP LENS AND IMAGE PICKUP APPARATUS

(75) Inventor: Yu Kitahara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 93 days.

(21) Appl. No.: 13/153,979

(22) Filed: Jun. 6, 2011

(65) Prior Publication Data

US 2011/0299178 A1    Dec. 8, 2011

(30) Foreign Application Priority Data

Jun. 7, 2010  (JP) ................. 2010-129519

(51) Int. Cl.
*G02B 3/02*     (2006.01)
(52) U.S. Cl.
USPC .......................... 359/715; 359/708
(58) Field of Classification Search
USPC .................. 359/642, 708, 713–715
See application file for complete search history.

(56) References Cited

U.S. PATENT DOCUMENTS

| | | |
|---|---|---|
| 6,747,816 B2 | 6/2004 | Sato |
| 7,009,783 B2 | 3/2006 | Do |
| 7,289,273 B2 | 10/2007 | Mihara |
| 7,760,444 B2 | 7/2010 | Iyama |
| 2002/0196564 A1* | 12/2002 | Sato ............................. 359/753 |
| 2005/0207024 A1 | 9/2005 | Mihara |

FOREIGN PATENT DOCUMENTS

| | | |
|---|---|---|
| JP | 09-189856 | 7/1997 |
| JP | 3756114 | 3/2006 |

OTHER PUBLICATIONS

Extended European Search Report issued Sep. 20, 2011 by the European Patent Office in corresponding European Patent Application No. 11168802.4, 7 pages.

* cited by examiner

*Primary Examiner* — James Greece

(74) *Attorney, Agent, or Firm* — Young & Thompson

(57) ABSTRACT

An image pickup lens having a four lens configuration in which a bi-concave first lens, a bi-convex second lens, a bi-concave third lens, and a positive fourth lens are disposed in this order from an object side. Here, at least one of the first, second, third, and fourth lenses has an aspherical surface on each side. The image pickup lens satisfies Conditional Expression (1) given below when a refractive index of the second lens with respect to d-line is taken as Nd2.

$$1.6 < Nd2 \qquad (1)$$

11 Claims, 11 Drawing Sheets

EXAMPLE 1

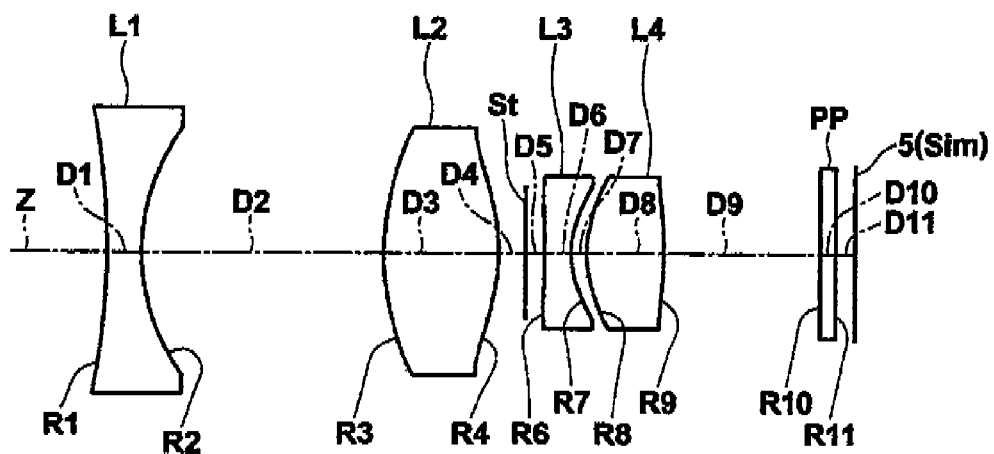
FIG.1 EXAMPLE 1
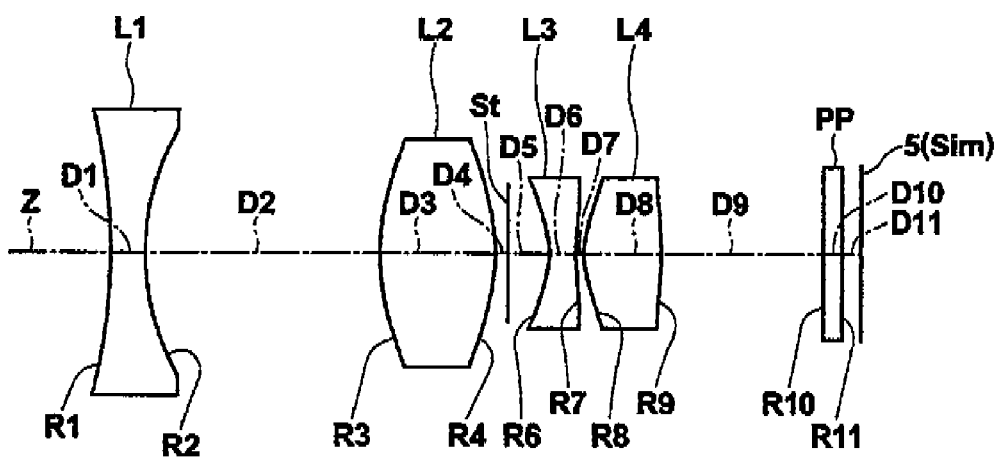
FIG.2 EXAMPLE 2

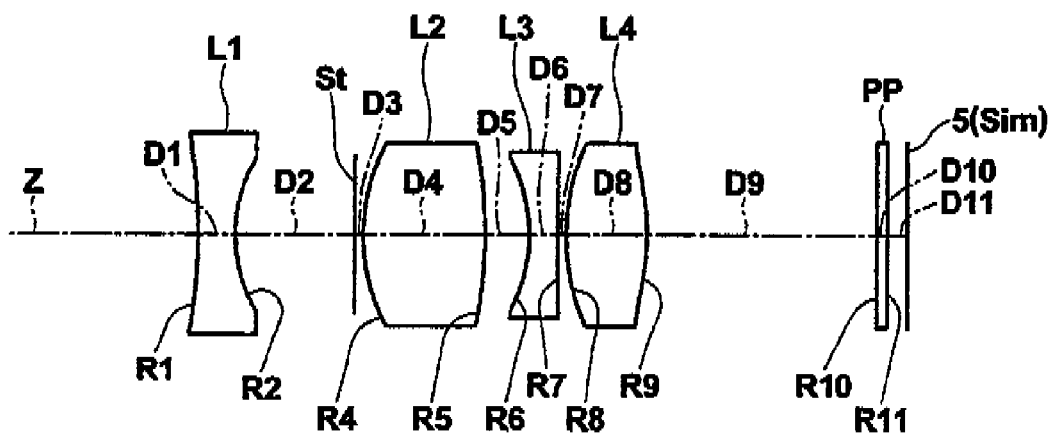
FIG.3 EXAMPLE 3
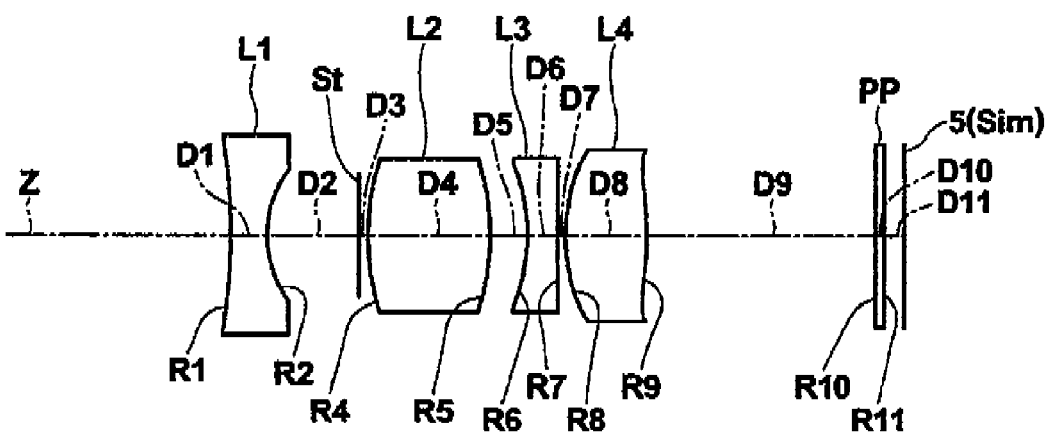
FIG.4 EXAMPLE 4

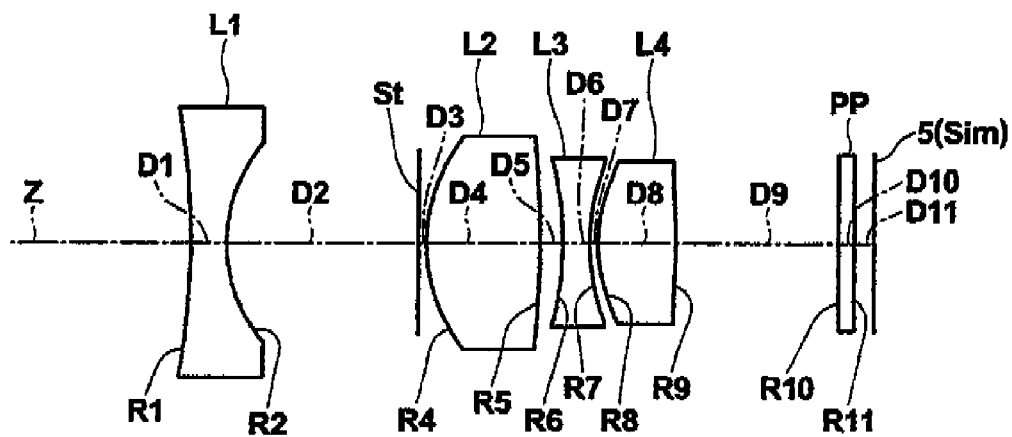
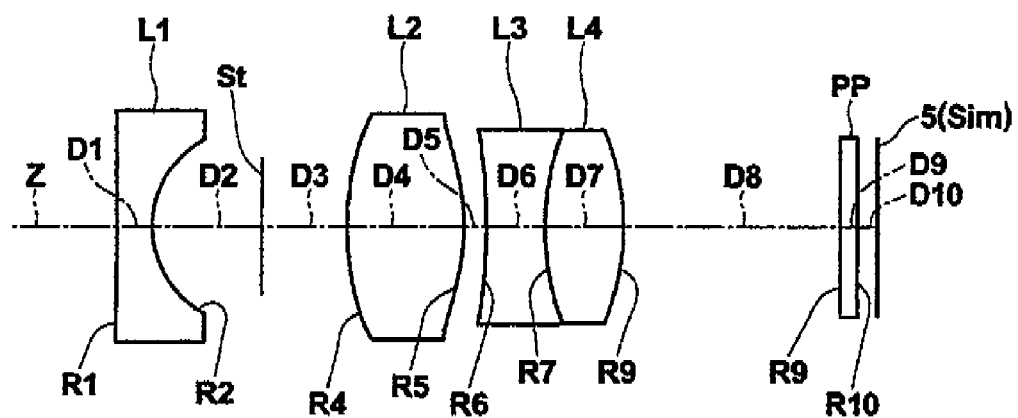

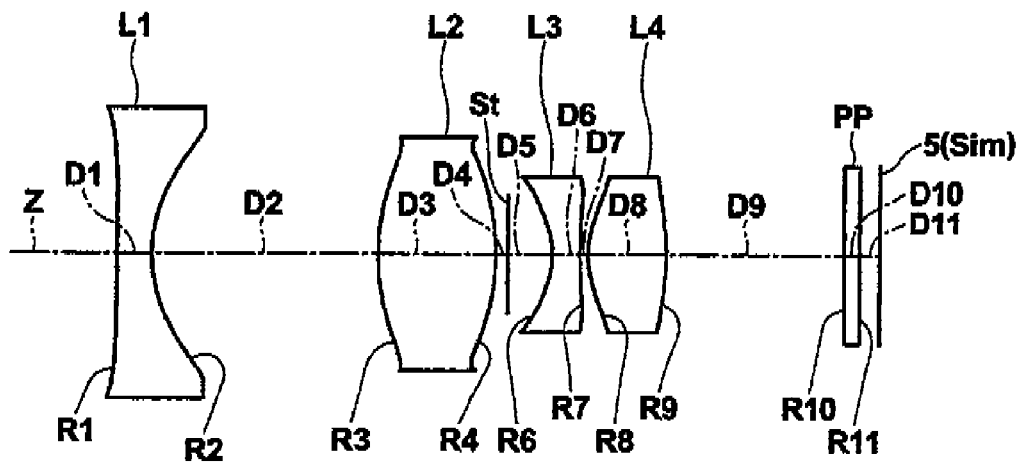
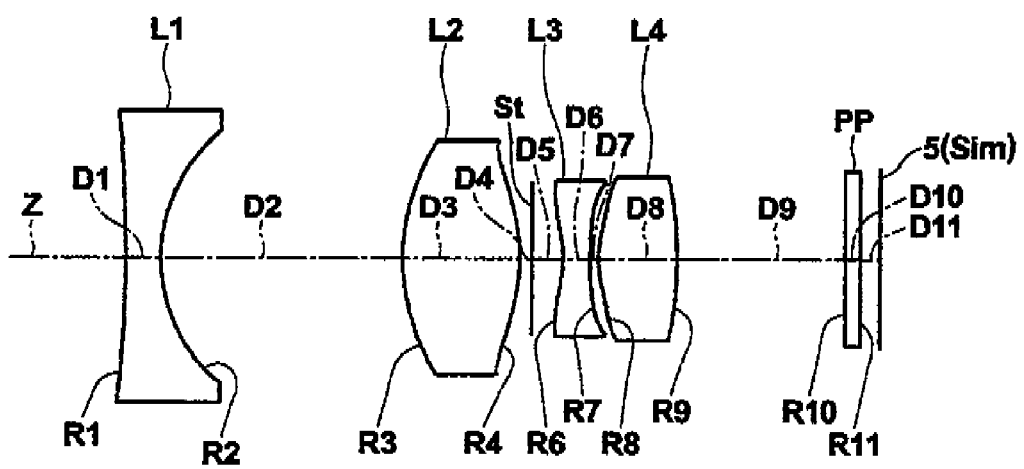

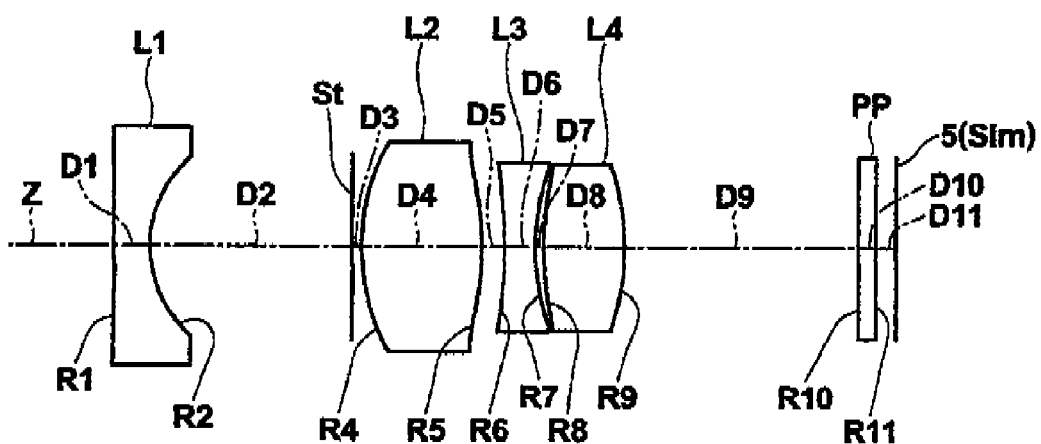
FIG.9  EXAMPLE 9

EXAMPLE 1

Fno. = 2.09
-0.2mm  0.2mm
SPHERICAL ABERRATION

— e-LINE
----- g-LINE
--- C-LINE

ω = 30.1°
-0.1mm  0.1mm
ASTIGMATISM

— SAGITTAL
----- TANGENTIAL

ω = 30.1°
-10%  10%
DISTORTION

ω = 30.1°
-10μm  10μm
LATERAL CHROMATIC ABERRATION

----- g-LINE
--- C-LINE

EXAMPLE 2

Fno. = 2.00
-0.2mm  0.2mm
SPHERICAL ABERRATION

— e-LINE
----- g-LINE
--- C-LINE

ω = 30.1°
-0.1mm  0.1mm
ASTIGMATISM

— SAGITTAL
----- TANGENTIAL

ω = 30.1°
-10%  10%
DISTORTION

ω = 30.1°
-10μm  10μm
LATERAL CHROMATIC ABERRATION

----- g-LINE
--- C-LINE

EXAMPLE 3

Fno. = 2.06
-0.2mm  0.2mm
SPHERICAL
ABERRATION

—— e-LINE
----- g-LINE
——- C-LINE

ω = 30.2°
-0.1mm  0.1mm
ASTIGMATISM

—— SAGITTAL
----- TANGENTIAL

ω = 30.2°
-10%  10%
DISTORTION

ω = 30.2°
-10μm  10μm
LATERAL
CHROMATIC
ABERRATION

----- g-LINE
——- C-LINE

EXAMPLE 4

Fno. = 2.37
-0.2mm  0.2mm
SPHERICAL
ABERRATION

—— e-LINE
----- g-LINE
——- C-LINE

ω = 30.1°
-0.1mm  0.1mm
ASTIGMATISM

—— SAGITTAL
----- TANGENTIAL

ω = 30.1°
-10%  10%
DISTORTION

ω = 30.1°
-10μm  10μm
LATERAL
CHROMATIC
ABERRATION

----- g-LINE
——- C-LINE

EXAMPLE 5

-0.2mm 0.2mm
SPHERICAL
ABERRATION

—— e-LINE
----- g-LINE
—·— C-LINE

-0.1mm 0.1mm
ASTIGMATISM

—— SAGITTAL
----- TANGENTIAL

-10% 10%
DISTORTION

-10μm 10μm
LATERAL
CHROMATIC
ABERRATION

----- g-LINE
—·— C-LINE

EXAMPLE 6

-0.2mm 0.2mm
SPHERICAL
ABERRATION

—— e-LINE
----- g-LINE
—·— C-LINE

-0.1mm 0.1mm
ASTIGMATISM

—— SAGITTAL
----- TANGENTIAL

-10% 10%
DISTORTION

-10μm 10μm
LATERAL
CHROMATIC
ABERRATION

----- g-LINE
—·— C-LINE

EXAMPLE 7

Fno. = 2.30
-0.2mm   0.2mm
SPHERICAL
ABERRATION

—— e-LINE
----- g-LINE
—-— C-LINE

ω= 30.1°
-0.1mm   0.1mm
ASTIGMATISM

—— SAGITTAL
----- TANGENTIAL

ω= 30.1°
-10%   10%
DISTORTION

ω= 30.1°
-10μm   10μm
LATERAL
CHROMATIC
ABERRATION

----- g-LINE
—-— C-LINE

EXAMPLE 8

Fno. = 2.02
-0.2mm   0.2mm
SPHERICAL
ABERRATION

—— e-LINE
----- g-LINE
—-— C-LINE

ω= 30.1°
-0.1mm   0.1mm
ASTIGMATISM

—— SAGITTAL
----- TANGENTIAL

ω= 30.1°
-10%   10%
DISTORTION

ω= 30.1°
-10μm   10μm
LATERAL
CHROMATIC
ABERRATION

----- g-LINE
—-— C-LINE

EXAMPLE 9

Fno. = 2.00

-0.2mm  0.2mm
SPHERICAL
ABERRATION

—— e-LINE
----- g-LINE
—-— C-LINE

ω= 30.1°

-0.1mm  0.1mm
ASTIGMATISM

—— SAGITTAL
----- TANGENTIAL

ω= 30.1°

-10%  10%
DISTORTION

ω= 30.1°

-10μm  10μm
LATERAL
CHROMATIC
ABERRATION

----- g-LINE
—-— C-LINE

IMAGE PICKUP LENS AND IMAGE PICKUP APPARATUS

BACKGROUND OF THE INVENTION

1. Field of the Invention

The present invention relates to an image pickup lens and an image pickup apparatus, and more particularly to an image pickup lens appropriate for use with a vehicle camera, portable terminal camera, surveillance camera, or the like having an image sensor, such as a CCD (charge coupled device) or a CMOS (complementary metal oxide semiconductor), and an image pickup apparatus having the image pickup lens.

2. Description of the Related Art

Image sensors, such as CCD or CMOS devices, have recently been greatly downsized with increased pixel counts. Consequently, image pickup devices themselves have also been downsized and image pickup lenses to be mounted on the devices are required to be downsized and improved in performance. In the mean time, lenses used in vehicle cameras and surveillance cameras are required to have a high weather resistance so as to be usable under a sever environment, in addition to be inexpensive and light weighted.

Conventional image pickup lenses with relatively fewer lenses known in the aforementioned fields include, for example, those described in Japanese Unexamined Patent Publication No. 119 (1997)-189856 (Patent Document 1), U.S. Pat. No. 7,760,444 (Patent Document 2), Japanese Patent No. 3756114 (Patent Document 3), and U.S. Pat. No. 7,009,783 (Patent Document 4). Patent Document 1 describes a five lens image pickup lens system in which a first lens on the most object side is a negative meniscus lens with a convex surface oriented to the object side. Patent Documents 2 and 3 describe a four lens image pickup lens system in which a first lens on the most object side is a negative meniscus lens with a convex surface oriented to the object side. Patent Document 4 describes a four lens image pickup lens system in which a first lens on the most object side is a negative meniscus lens with a concave surface oriented to the object side.

In the mean time, requirements for the lenses in the fields described above have been getting strict year after year and the lenses need to satisfy a plurality of sophisticated conditions simultaneously. That is, a compact image pickup lens with fewer lenses, yet having a long back focus to allow a cover glass, filter, and the like to be inserted between the lens system and image sensor, having a small F-number that allows the use of the lens under low illumination, such as during night, ensuring a wide total angle of view of about 60°, and being satisfactorily corrected in aberration, has been sought.

For the image pickup lenses described in Patent Document 1 and Patent Document 2, however, it is difficult to bring forward downsizing while ensuring a long back focus since the power of the first lens on the most object side is small. The image pickup lens described in Patent Document 3 has a large F-number of 3.5 which is inadequate for night time use. The image pickup lens described in Patent Document 4 has a somewhat large F-number of 2.8 and it is difficult to have a wide angle of view because the first lens on the most object side has a negative meniscus shape with a concave surface oriented to the object side.

In view of the circumstances described above, it is an object of the present invention to provide a compact image pickup lens, yet with a long back focus, a wide angle of view, a small F-number, and high optical performance. It is a further object of the present invention to provide an image pickup apparatus having the aforementioned image pickup lens.

SUMMARY OF THE INVENTION

An image pickup lens of the present invention is an image pickup lens having a four lens configuration in which a bi-concave first lens, a bi-convex second lens, a bi-concave third lens, and a positive fourth lens are disposed in this order from an object side, wherein:

at least one of the first, second, third, and fourth lenses has an aspherical surface on each side; and the image pickup lens satisfies Conditional Expression (1) given below when a refractive index of the second lens with respect to d-line is taken as Nd2.

$$1.6 < Nd2 \tag{1}$$

Preferably, the image pickup lens of the present invention satisfies any one of Conditional Expressions (2) to (6) given below or a combination of any two or more of them.

$$R2 < |R1| \tag{2}$$

$$-2.0 < f1/f < -0.7 \tag{3}$$

$$50 < vd1 \tag{4}$$

$$0.5 < D12/f < 1.5 \tag{5}$$

$$vd3 < 30 \tag{6}$$

where,
R1: a radius of curvature of the first lens on the object side;
R2; a radius of curvature of the first lens on the image side;
f: a focal length of the entire lens system;
vd1: an Abbe number of the first lens with respect to d-line;
vd3: an Abbe number of the third lens with respect to d-line; and
D12: a distance between the first and second lenses on an optical axis.

In the image pickup lens of the present invention, an aperture may be disposed between the first and second lenses or between the second and third lenses.

In the image pickup lens of the present invention, all of the lenses may be uncemented single lenses or the third and fourth lens may be cemented together.

Preferably, in the image pickup lens of the present invention, the first lens is made of glass. Further, in the image pickup lens of the present invention, it is more preferable that all of the lenses are made of glass.

The phrase "bi-concave lens" with respect to the first lens, "bi-convex lens" with respect to the second lens, "bi-concave lens" with respect to the third lens, or "positive lens" with respect to the fourth lens is applicable in a paraxial region if the lens is an aspherical lens, and if the first lens is an aspherical lens, radii of paraxial curvature are used as the radii of curvature in Conditional Expression (2). As for the sign of the radii of curvature in Conditional Expression (2), a positive sign is used if the surface shape is convex toward the object side and a negative sign is used if the surface shape is convex toward the image side.

An image pickup apparatus of the present invention is an apparatus that includes the image pickup lens described above.

According to the present invention, an image pickup lens having a compact configuration of four lenses, yet with a long back focus, a wide angle of view, a small F-number, and favorable optical performance is realized through appropriate power arrangement, appropriate setting of the shape or power sign for each lens, inclusion of an aspherical lens, and satisfaction of Conditional Expression (1). Further, the present invention may also realize an image pickup apparatus having the image pickup lens described above.

BRIEF DESCRIPTION OF THE DRAWINGS

FIG. 1 is a cross-sectional view of an image pickup lens according to Example 1 of the present invention, illustrating a configuration thereof.

FIG. 2 is a cross-sectional view of an image pickup lens according to Example 2 of the present invention, illustrating a configuration thereof.

FIG. 3 is a cross-sectional view of an image pickup lens according to Example 3 of the present invention, illustrating a configuration thereof.

FIG. 4 is a cross-sectional view of an image pickup lens according to Example 4 of the present invention, illustrating a configuration thereof.

FIG. 5 is a cross-sectional view of an image pickup lens according to Example 5 of the present invention, illustrating a configuration thereof.

FIG. 6 is a cross-sectional view of an image pickup lens according to Example 6 of the present invention, illustrating a configuration thereof.

FIG. 7 is a cross-sectional view of an image pickup lens according to Example 7 of the present invention, illustrating a configuration thereof.

FIG. 8 is a cross-sectional view of an image pickup lens according to Example 8 of the present invention, illustrating a configuration thereof.

FIG. 9 is a cross-sectional view of an image pickup lens according to Example 9 of the present invention, illustrating a configuration thereof.

DESCRIPTION OF THE PREFERRED EMBODIMENTS

Figure 10A:
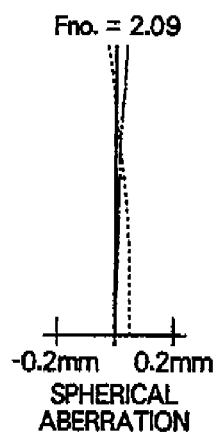
FIG. 10A to 10D illustrate respective aberrations of the image pickup lens according to Example 1 of the present invention.
Figure 10B:
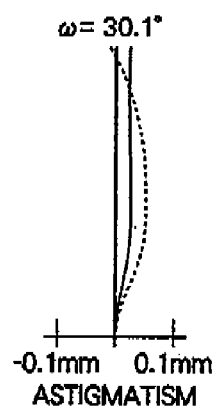
Figure 10C:
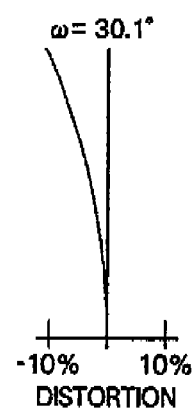
Figure 10D:
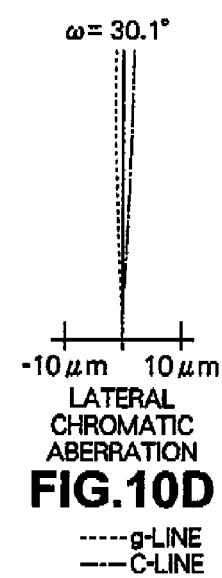
Figure 11A:
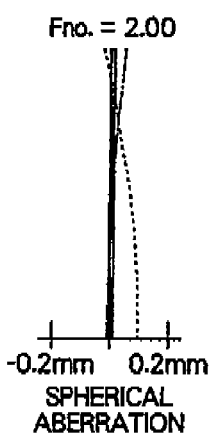
FIG. 11A to 11D illustrate respective aberrations of the image pickup lens according to Example 2 of the present invention.
Figure 11B:
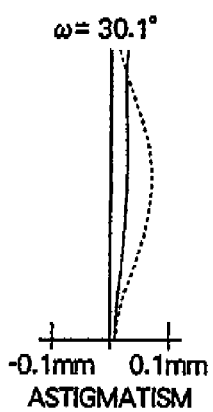
Figure 11C:
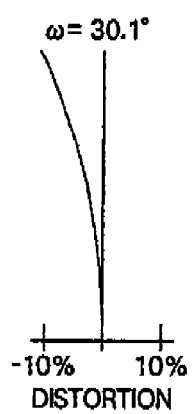
Figure 11D:
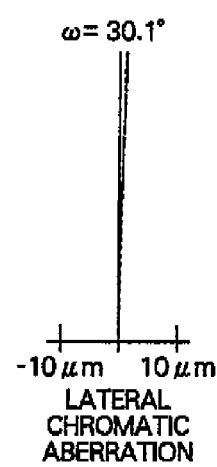
Figure 12A:
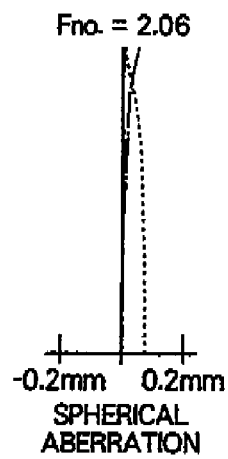
FIG. 12A to 12D illustrate respective aberrations of the image pickup lens according to Example 3 of the present invention.
Figure 12B:
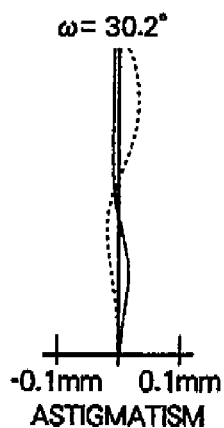
Figure 12C:
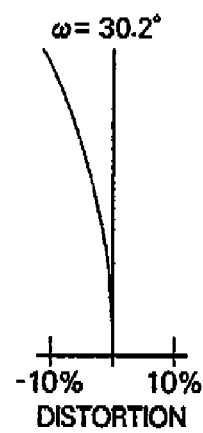
Figure 12D:
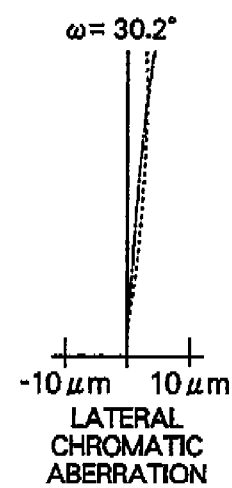
Figure 13A:
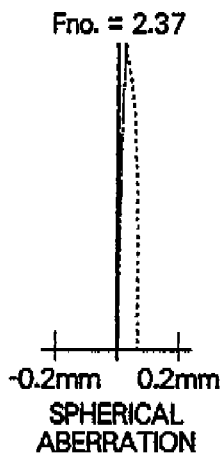
FIG. 13A to 13D illustrate respective aberrations of the image pickup lens according to Example 4 of the present invention.
Figure 13B:
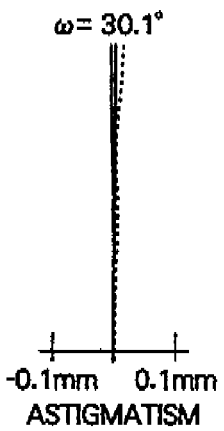
Figure 13C:
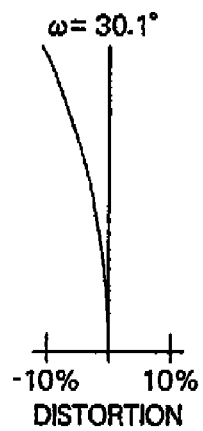
Figure 13D:
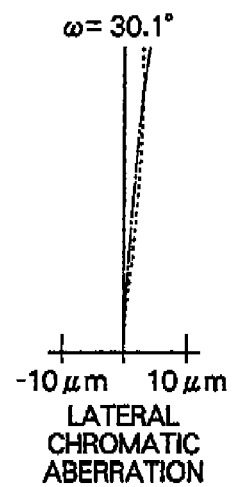
Figure 14A:
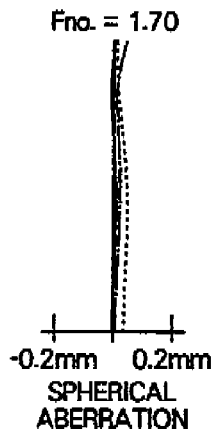
FIG. 14A to 14D illustrate respective aberrations of the image pickup lens according to Example 5 of the present invention.
Figure 14B:
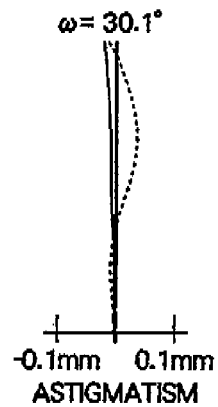
Figure 14C:
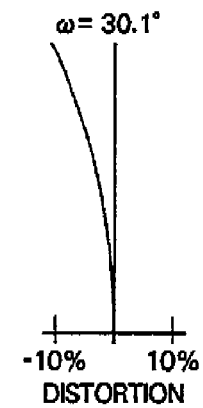
Figure 14D:
Figure 15A:
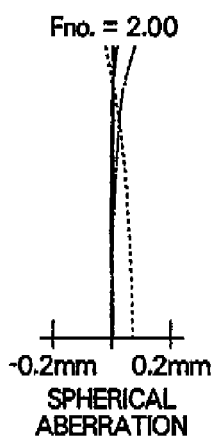
FIG. 15A to 15D illustrate respective aberrations of the image pickup lens according to Example 6 of the present invention.
Figure 15B:
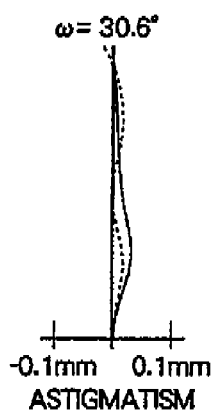
Figure 15C:
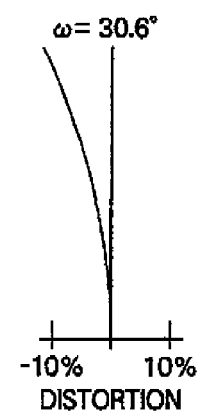
Figure 15D:
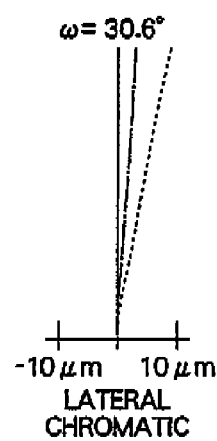
Figure 16A:
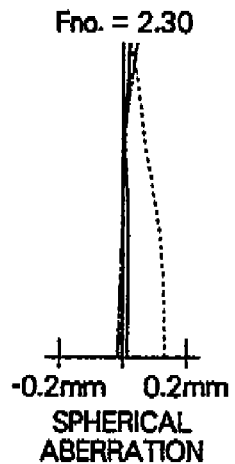
FIG. 16A to 16D illustrate respective aberrations of the image pickup lens according to Example 7 of the present invention.
Figure 16B:
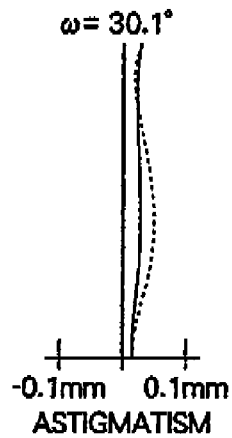
Figure 16C:
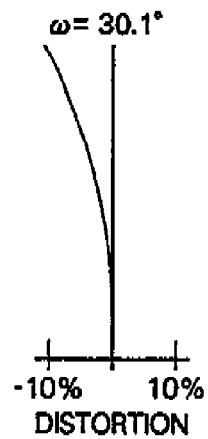
Figure 16D:
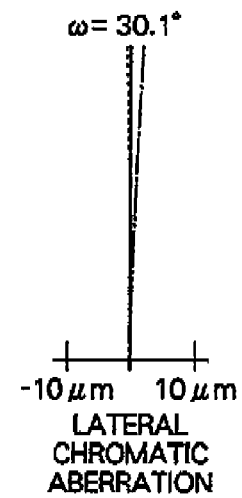
Figure 17A:
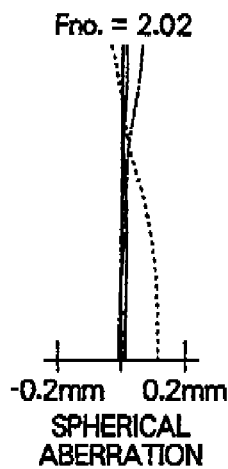
FIG. 17A to 17D illustrate respective aberrations of the image pickup lens according to Example 8 of the present invention.
Figure 17B:
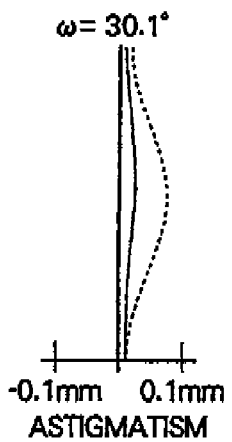
Figure 17C:
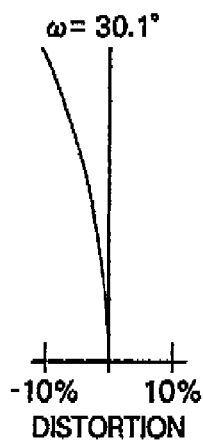
Figure 17D:
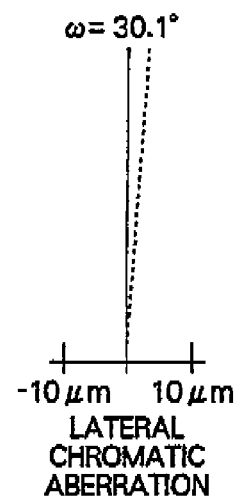
Figure 18A:
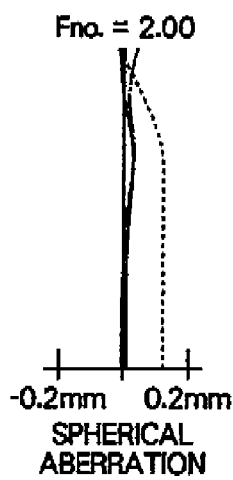
FIG. 18A to 18D illustrate respective aberrations of the image pickup lens according to Example 9 of the present invention.
Figure 18B:
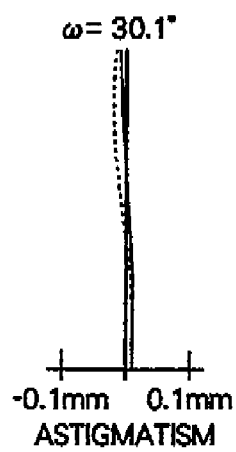
Figure 18C:
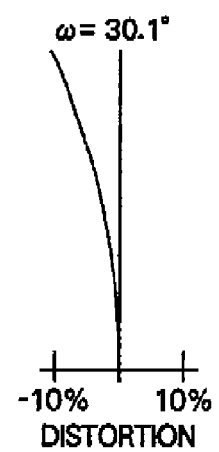
Figure 18D:
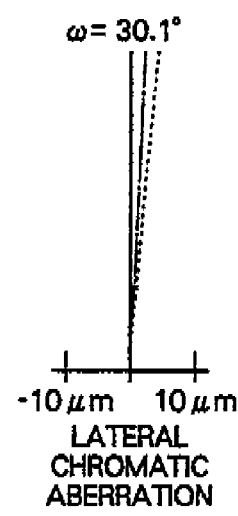

Hereinafter, embodiments of the present invention will be described in detail with reference to the accompanying drawings.

FIGS. 1 to 9 are cross-sectional views of image pickup lenses according to embodiments of the present invention, illustrating example configurations thereof. The lenses shown in FIGS. 1 to 9 correspond respectively to lenses of Examples 1 to 9, to be described later. Basic configurations of examples shown in FIGS. 1 to 9 are identical and are illustrated in the same manner. Therefore, description of image pickup lenses according to embodiments of the present invention will be made with reference mainly to the example configuration in FIG. 1.

The image pickup lens shown in FIG. 1 has a four lens configuration in which first lens L1, second lens L2, third lens L3, and fourth lens L4 are disposed in this order from an object side. Aperture stop St may be disposed between the second lens L2 and third lens L3, as in the example illustrated in FIG. 1. But the position of aperture stop St in the image pickup lens of the present invention is not necessary limited to this. The illustrated aperture stop St is not necessarily depicted in an actual size and a shape in FIG. 1 but its position on the optical axis is indicated. In FIG. 1, the left side is the object side and the right side is the image side and reference symbol Ri (i=1, 2, 3, - - - ) represents a radius of curvature of each lens surface and reference symbol Di (i=1, 2, 3, - - - ) represents a surface distance.

Note that FIG. 1 also shows image sensor 5 disposed on image plane Sim, considering the case in which image pickup lens is applied to an image pickup apparatus. The image sensor 5 is a device that converts an optical image formed by image pickup lens to an electrical signal and is constituted, for example, by a CCD image sensor, a CMOS image sensor, or the like.

When the image pickup lens is applied to an image pickup apparatus, it is preferable that a cover glass, a low-pass filter, or an infrared light cut filter is provided according to the structure of the camera on which the lens is mounted, and FIG. 1 illustrates an example case in which a parallel plate optical member PP, assuming these, is provided between the most image side lens and image sensor 5 (image plane Sim).

In the image pickup lens of the present invention, first lens L1 is a bi-concave lens, second lens L2 is a bi-convex lens, third lens L3 is a bi-concave lens, and fourth lens L4 is a positive lens, in which at least one of the four lenses has an aspherical surface on each side. The surface shape and sign of each lens described herein are those in a paraxial region if the lens is an aspherical lens.

Employment of a bi-concave lens, a bi-convex lens, and a bi-concave lens for first lens L1, second lens L2, and third lens L3 respectively allows refractive power of each lens to be increased and, thereby, the image pickup lens may be configured with a small number of lenses. Further, employment of a negative lens for first lens L1 on the most object side and a positive lens for fourth lens L4 on the most image side allows a long back focus. Arrangement of a bi-convex lens as second lens L2 and a bi-concave lens as third lens L3 between first lens L1 and fourth lens L4 allows field curvature and astigmatism to be eliminated. Further, employment of aspherical surfaces for a plurality of surfaces allows spherical aberration and distortion to be corrected satisfactorily, which is advantageous for realizing high optical performance while ensuring a wide angle and a small F-number.

The present image pickup lens is configured so as to satisfy Conditional Expression (1) given below when the refractive index of second lens L2 with respect to d-line is taken as Nd2.

$$1.6 < Nd2 \tag{1}$$

In the present image pickup lens, it is preferable that relatively strong power is allocated to each lens because the image pickup lens is formed of only a small number of four lenses. In particular, it is preferable that strong power is allocated to second lens L2, which is a positive lens, among the lenses for chromatic aberration correction and downsizing. If Nd2 exceeds the lower limit of Conditional Expression (1), the curvature of the lens needs to be increased in order to increase the power, thereby causing difficulty in correcting field curvature and lateral chromatic aberration.

It is more preferable that the present image pickup lens is configured so as to satisfy Conditional Expression (1-1) given below instead of Conditional Expression (1).

$$1.68 < Nd2 \tag{1-1}$$

Further, it is preferable that the present image pickup lens has any one of the following configurations or a combination of any two or more of them.

Preferably, the image pickup lens satisfies Conditional Expression (2) given below when a radius of curvature of first lens L1 on the object side is taken as Ri and a radius of curvature of first lens L1 on the image side is taken as R2.

$$R2 < |R1| \tag{2}$$

Employment of a bi-concave lens that satisfies Conditional Expression (2) for first lens L1 allows a wide angle of view while suppressing the generation of spherical aberration.

Preferably, the image pickup lens satisfies Conditional Expression (3) given below when a focal length of the entire lens system is taken as f and a focal length of first lens L1 is taken as f1.

$$-2.0 < f1/f < -0.7 \tag{3}$$

If f1/f exceeds the upper limit of Conditional Expression (3), correction of lateral chromatic aberration becomes difficult, while if it exceeds the lower limit, a long back focus and correction of field curvature become difficult.

Here, it is more preferable that the image pickup lens satisfies Conditional Expression (3-1) given below instead of Conditional Expression (3).

$$-1.8 < f1/f < -0.8 \tag{3-1}$$

Preferably, the image pickup lens satisfies Conditional Expression (4) given below when an Abbe number of first lens L1 with respect to d-line is taken as vd1.

$$50 < vd1 \tag{4}$$

Selection of a material that satisfies Conditional Expression (4) allows chromatic aberration, in particular, axial chromatic aberration to be suppressed easily.

Preferably, the image pickup lens satisfies Conditional Expression (5) given below when a focal length of the entire lens system is taken as f and a distance between first lens L1 and second lens L2 on the optical axis is taken as D12.

$$0.5 < D12/f < 1.5 \tag{5}$$

If D12/f exceeds the upper limit of Conditional Expression (5), the size of the entire lens system can not be reduced. In the present image pickup lens, a long back focus is ensured by first broadening light beam through first lens L1 and then causing focusing the light beam broadened to a certain extent through second lens L2. Consequently, if D12/f exceeds the lower limit of Conditional Expression (5), it is necessary to broaden a light beam while the light beam is passing through a short distance between first lens L1 and second lens L2, and the focal length of first lens L1 needs to be reduced, causing difficulty in correcting lateral chromatic aberration.

Preferably, the image pickup lens satisfies Conditional Expression (6) given below when an Abbe number of third lens L3 with respect to d-line is taken as vd3.

$$vd3 < 30 \tag{6}$$

Selection of a material that satisfies Conditional Expression (6) allows astigmatism to be suppressed and lateral chromatic aberration to be corrected easily.

Here, it is more preferable that the image pickup lens satisfies Conditional Expression (6-1) given below instead of Conditional Expression (6).

$$vd3 < 26 \tag{6-1}$$

Preferably, fourth lens L4 is a bi-convex lens. Employment of a bi-convex lens for fourth lens L4 allows required positive power to be ensured in a system of a small number of lenses.

Preferably, aperture stop St is disposed between first lens L1 and second lens L2 or between second lens L2 and third lens L3. If aperture stop St is disposed between first lens L1 and second lens L2, the exit pupil position may be set at a position remote from the imaging plane and high telecentricity may be provided easily. When aperture stop St is disposed between second lens L2 and third lens L3, the power distribution becomes substantially uniform between the object side and image side of the aperture stop St, whereby generation of off-axis aberrations, such as astigmatism and distortion may be prevented.

Further, the image pickup lens may have a four group four element configuration formed of four uncemented single lenses or a three group four element configuration in which first and second lenses L1, L2 are single lenses, while third and fourth lenses L3, L4 are cemented together. The four group four element configuration is advantageous in environmental resistance because no cement is used, in addition to low cost in comparison with the case in which lenses are cemented and high design freedom. In the mean time, the three group four element configuration may correct axial chromatic aberration and lateral chromatic aberration more satisfactorily in comparison with the case in which the image pickup lese is formed of only single lenses.

Preferably, first lens L1 disposed on the most object side is made of a glass material. When first lens L1 is made of a glass material having higher environmental resistance than that of a plastic material, the environmental resistance of the lens system may be ensured. When the image pickup lens of the present invention is expected to be used under a severe environment, such as in a vehicle camera or the like, it is preferable that first lens L1 disposed on the most object side is made of a material which is resistant to surface degradation by the weather, temperature change by direct sunlight, and chemicals, such as grease, detergent, and the like, that is, a material having high water resistance, weather resistance, acid resistance, chemical resistance, and the like. Use of a glass material may satisfy these requirements. Further, as the material of first lens L1, for example, a transparent ceramic material may also be used. More specifically, for example, a material with water resistance of 1 by powder method defined by Japan Optical Glass Industries Association is preferably used. Further, it is preferable that all of the lenses of the system are made of a glass material or a transparent ceramic material in order to ensure higher environmental resistance.

A protection means may be provided on the object side surface of first lens L1 for improving the strength, scratch resistance, and chemical resistance. In such a case, the material of first lens L1 may be a plastic material. The protection means may be a hard coating or a water-repellent coating.

Any one of second lens L2, third lens L3, and fourth lens L4 or any combination thereof may be made of a plastic material. Use of a plastic material allows the lens system to be formed inexpensively and lightweight. Further, when an aspherical surface is provided, the aspherical surface shape may be shaped accurately and, thereby satisfactory optical performance may be ensured.

In a case where a plastic material is used for any of second lens L2, third lens L3, and fourth lens L4, a so-called nano-composite material which is a composite of a plastic and fine particles smaller than a wavelength of light may be used. The refractive index and Abbe number of the nano-composite material may be changed according to the type and amount of the fine particles to be mixed. The use of the nano-composite material allows a material having a high refractive index or a small Abbe number, which heretofore has not been obtained by any plastic material, to be provided, whereby a lens having satisfactory optical performance may be manufactured.

Note that a filter for cutting ultraviolet light to blue light or an IR (infrared) cut filter for cutting infrared light may be inserted between the lens system and image sensor 5 according to the intended use of the image pickup lens. Alternatively, a coating having identical characteristics to those of the filters described above may be applied on a lens surface. Otherwise, a material that absorbs ultraviolet light, blue light, or infrared light may be used for any one of the lenses.

FIG. 1 illustrates an example case in which an optical member PP, representing various types of filters, is disposed between the lens system and image sensor 5. Instead of this, each of the various types of filters may be disposed between each of the lenses. Alternatively, a coating that acts as the various types of filters may be applied on a lens surface of any of the lenses of the image pickup lens.

A light beam passing through outside of the effective diameter of each lens may possibly reach the image plane as stray light and become ghost. It is, therefore, preferable that the image pickup lens is provided with a light blocking means for blocking the stray light as required. As for the light blocking means, for example, an opaque coating material may be applied or an opaque plate may be provided on a portion of the image side surface of each lens outside of the effective diameter. Alternatively, an opaque plate may be provided in the optical path of a light beam that becomes stray light as the light blocking means. Otherwise, a hood or the like may be disposed at a position on the object side of the most object side lens.

Further, a member, such as an aperture or the like, for blocking a marginal ray to the extent that does not cause a problem in the relative illumination may be disposed between each lens. The term "marginal ray" as used herein refers to a light beam of those from an object point outside of optical axis Z passing through a peripheral portion of the entrance pupil of an optical system. By disposing a member for blocking a marginal ray in this way, the quality in a peripheral portion of an image may be improved. Further, by blocking light that causes ghost, ghost may be reduced.

Numerical examples of image pickup lens of the present invention will now be described. Cross-sectional views of image pickup lenses of Examples 1 to 9 are illustrated in FIGS. 1 to 9 respectively. In each of FIGS. 1 to 9, the left side is an object side and right side is an image side, and aperture stop St and optical member PP are also shown. Aperture stop St in each drawing is not necessarily depicted in an actual size and a shape but to indicate the position on optical axis Z. In each example, symbols Ri, Di (i=1, 2, 3, - - - ) in the lens cross-sectional view correspond to lens data Ri, Di to be described in the following.

Surface data of Lens data of the image pickup lens of Example 1 are shown in Table 1 and aspherical surface data are shown in Table 2. Likewise, surface data of lens data of the image pickup lenses of Examples 2 to Examples 9 and aspherical surface data are shown in Tables 3 to 18 respectively. Hereinafter, symbols in the tables will be described by way of Example 1, but symbols in Examples 2 to 9 are basically identical to those of Example 1.

In the surface data of Table 1, Si column represents $i^{th}$ (i 1, 2, 3, - - - ) surface number, which is gradually incremented toward image side with the surface of the component disposed on the most object side being taken as the first surface. The Ri column in Table 1 represents a radius of curvature of $i^{th}$ surface and the Di column represents a surface distance between $i^{th}$ surface and $i^{th}$+1 surface on optical axis Z. In the Ri column of Table 1, a positive sign is used if the surface is convex toward the object side and a negative sign is used if the surface is convex toward the image side. A surface distance between the final surface shown in the table and image plane Sim is indicated at the bottom of Di column.

Further, in the surface data of Table 1, Ndj column represents a refractive index of $j^{th}$ lens (j=1, 2, 3, - - - ) with respect to d-line (wavelength of 587.6 nm), which is gradually incremented toward the image side with the lens disposed at the most object side being taken as the first lens. The vdj column represents an Abbe number of $j^{th}$ optical element with respect to d-line. The surface data include aperture stop St and optical member PP, and the surface number field corresponding to the aperture stop St includes the phrase "(Aperture Stop)".

In the surface data of Table 1, an asterisk mark is attached to the surface number of each aspherical surface and a value of radius of curvature adjacent to the optical axis (paraxial radius of curvature) is indicated as the radius of curvature of the aspherical surface. Aspherical surface data in Table 2 include the surface number, a paraxial curvature and aspherical coefficient of each aspherical surface. In the aspherical surface data of Table 2, a numerical value "E−n" (n: an integer) refers to "×10$^{-n}$" and "E+n" refers to "×10$^n$". The aspherical surface coefficients represent the value of each of coefficients KA and Bm (m=3, 4, 5, - - - , 10) in the aspherical surface equation given below.

$$Zd = \frac{C \times Y^2}{1 + \sqrt{1 - KA \times C^2 \times Y^2}} + \sum_m B_m Y^m$$

where,

Zd: depth of aspherical surface (a length of the vertical line from a point on the aspherical surface at height Y to a flat surface orthogonal to an optical axis to which the aspherical vertex contact), Y: height (distance from the optical axis to lens surface), C: paraxial curvature, and KA, Bm: aspherical coefficients (m=3, 4, 5, - - - , 10).

TABLE 1

EXAMPLE 1 SURFACE DATA

| Si | Ri | Di | Ndj | v dj |
|---|---|---|---|---|
| 1 | −19.1813 | 0.900 | 1.58913 | 61.2 |
| 2 | 5.5902 | 6.271 | | |
| 3 * | 6.6214 | 3.000 | 1.69098 | 53.0 |
| 4 * | −4.6569 | 0.704 | | |
| 5(APERTURE STOP) | ∞ | 0.482 | | |
| 6 * | −19.6807 | 0.701 | 1.61400 | 25.5 |
| 7 * | 2.1692 | 0.400 | | |
| 8 * | 2.8066 | 2.000 | 1.53391 | 56.0 |
| 9 * | −10.0261 | 4.088 | | |
| 10 | ∞ | 0.400 | 1.51680 | 64.2 |
| 11 | ∞ | 0.500 | | |

TABLE 2

EXAMPLE 1 ASPHERICAL SURFACE DATA

| | S3 | S4 | S6 | S7 | S8 | S9 |
|---|---|---|---|---|---|---|
| C | 1.510250175E−01 | −2.147374032E−01 | −5.081119579E−02 | 4.609921288E−01 | 3.563059890E−01 | −9.973978182E−02 |
| KA | 7.627147637E−01 | −8.459570665E+00 | 1.082509304E+01 | −2.353135326E+00 | −4.839799381E+00 | −1.630677901E+01 |
| B3 | −1.563829503E−03 | −7.271304498E−04 | 5.194942803E−03 | 2.793732674E−03 | 3.578980070E−03 | 1.553762875E−03 |
| B4 | 3.306908776E−04 | −1.577353603E−04 | 7.125711249E−03 | −3.362440363E−03 | 4.725725769E−04 | 8.034712604E−04 |
| B5 | 4.775687503E−05 | 6.019356252E−05 | −2.679007219E−03 | −4.412792343E−04 | 5.274918238E−03 | −1.928875144E−03 |
| B6 | −8.463650050E−05 | −1.140324157E−04 | −2.504929729E−03 | 5.948450816E−05 | 3.327238916E−04 | 4.028464452E−03 |
| B7 | −2.470406364E−04 | −3.929747709E−04 | 8.995574922E−04 | −2.173695839E−03 | −4.373002830E−03 | 4.827012816E−04 |
| B8 | 1.768512451E−04 | 4.095143284E−04 | 8.431652383E−04 | −5.497531937E−04 | −3.729281898E−03 | −4.477605276E−03 |
| B9 | −4.650552882E−05 | −1.388244978E−04 | −1.946755346E−04 | 2.880556679E−03 | 5.690804746E−03 | 2.837369754E−03 |
| B10 | 5.049345263E−06 | 1.720315122E−05 | −4.059294027E−05 | −9.375716025E−04 | −1.527172931E−03 | −5.276891998E−04 |

TABLE 3

EXAMPLE 2 SURFACE DATA

| Si | Ri | Di | Ndj | νdj |
|---|---|---|---|---|
| 1 | −15.1912 | 0.900 | 1.58913 | 61.2 |
| 2 | 6.6386 | 6.078 | | |
| 3 * | 6.5919 | 2.998 | 1.69098 | 53.0 |
| 4 * | −4.7202 | 0.331 | | |
| 5(APERTURE STOP) | ∞ | 1.074 | | |
| 6 * | −1.9901 | 0.701 | 1.61400 | 25.5 |
| 7 * | 10.5287 | 0.203 | | |
| 8 * | 2.2688 | 2.000 | 1.53391 | 56.0 |
| 9 * | −8.8239 | 4.201 | | |
| 10 | ∞ | 0.500 | 1.51680 | 64.2 |
| 11 | ∞ | 0.500 | | |

TABLE 6

EXAMPLE 3 ASPHERICAL SURFACE DATA

| | S1 | S8 | S9 |
|---|---|---|---|
| C | −7.262830551E−02 | 1.791417371E−01 | −1.638941766E−01 |
| KA | 2.000000000E+01 | 3.627027355E+00 | 5.018784265E+00 |
| B3 | −2.233114714E−04 | −3.589776921E−03 | 9.896544867E−04 |
| B4 | 2.639754213E−03 | 6.084069408E−03 | 2.898307826E−04 |
| B5 | −1.153737732E−03 | −8.672323595E−03 | 9.758104190E−03 |
| B6 | 3.511654658E−04 | −4.158164469E−04 | −4.449806970E−03 |
| B7 | 0.000000000E+00 | 7.032788895E−03 | −1.734720510E−03 |
| B8 | 0.000000000E+00 | −5.350731115E−03 | 3.071945302E−03 |
| B9 | 0.000000000E+00 | 1.688506094E−03 | −1.282136406E−03 |
| B10 | 0.000000000E+00 | −2.029192614E−04 | 1.918293440E−04 |

TABLE 4

EXAMPLE 2 ASPHERICAL SURFACE DATA

| | S3 | S4 | S6 | S7 | S8 | S9 |
|---|---|---|---|---|---|---|
| C | 1.517006408E−01 | −2.118552173E−01 | −5.024802862E−01 | 9.497810533E−02 | 4.407610176E−01 | −1.133283269E−01 |
| KA | −3.164241826E−01 | −7.466790981E+00 | −6.781661183E+00 | −1.926322974E+01 | −6.845444550E+00 | 1.214194052E+01 |
| B3 | −4.679224993E−04 | −1.828665928E−03 | 7.139664606E−03 | 1.545838816E−02 | 1.247167077E−02 | 1.898559778E−03 |
| B4 | −1.280598553E−03 | 1.628619730E−03 | 5.135506914E−03 | 2.526382895E−03 | −7.594276187E−03 | 5.960887650E−03 |
| B5 | 1.990054561E−03 | −3.032541086E−04 | −2.692152193E−03 | −1.210203580E−02 | 1.046830026E−04 | 1.496557471E−03 |
| B6 | −5.223814722E−05 | −3.955486893E−04 | −4.433300566E−03 | −2.538678624E−03 | 2.088273030E−04 | 7.986443273E−04 |
| B7 | −1.271119698E−03 | −4.199751115E−04 | 1.067722473E−03 | 2.891342505E−03 | −4.077777279E−04 | −7.652755143E−04 |
| B8 | 8.592270846E−04 | 6.414328213E−04 | 1.433972836E−03 | −1.898149173E−04 | −2.372916061E−04 | 5.512776333E−05 |
| B9 | −2.319488692E−04 | −2.629730786E−04 | −7.827730526E−04 | 1.957205568E−05 | 3.917818485E−04 | 1.200995346E−04 |
| B10 | 2.288503764E−05 | 3.584034089E−05 | 1.186065918E−04 | −4.410514797E−05 | −9.503212954E−05 | −1.834529273E−05 |

TABLE 5

EXAMPLE 3 SURFACE DATA

| Si | Ri | Di | Ndj | νdj |
|---|---|---|---|---|
| 1 * | −13.7687 | 0.900 | 1.69098 | 53.0 |
| 2 | 3.7445 | 2.974 | | |
| 3(APERTURE STOP) | ∞ | 0.201 | | |
| 4 | 4.9436 | 2.998 | 1.88300 | 40.8 |
| 5 | −11.5885 | 1.098 | | |
| 6 | −4.1105 | 0.701 | 1.92286 | 18.9 |
| 7 | 198.2276 | 0.200 | | |
| 8 * | 5.5822 | 2.000 | 1.69098 | 53.0 |
| 9 * | −6.1015 | 5.688 | | |
| 10 | ∞ | 0.250 | 1.51680 | 64.2 |
| 11 | ∞ | 0.497 | | |

TABLE 7

EXAMPLE 4 SURFACE DATA

| Si | Ri | Di | Ndj | νdj |
|---|---|---|---|---|
| 1 | −15.0219 | 0.900 | 1.58913 | 61.2 |
| 2 | 2.8336 | 2.266 | | |
| 3(APERTURE STOP) | ∞ | 0.216 | | |
| 4 | 6.4202 | 3.000 | 1.88300 | 40.8 |
| 5 | −6.3159 | 0.934 | | |
| 6 | −4.7096 | 0.732 | 1.92286 | 18.9 |
| 7 | 82.2091 | 0.200 | | |
| 8 * | 5.1718 | 2.000 | 1.69098 | 53.0 |
| 9 * | −8.3348 | 5.663 | | |
| 10 | ∞ | 0.200 | 1.51680 | 64.2 |
| 11 | ∞ | 0.500 | | |

TABLE 8

EXAMPLE 4 ASPHERICAL SURFACE DATA

|     | S8              | S9              |
| --- | --------------- | --------------- |
| C   | 1.933558343E−01 | −1.199788131E−01 |
| KA  | 9.530361610E−01 | −8.993034151E+00 |
| B3  | −4.830080884E−04 | −4.717932764E−04 |
| B4  | 3.054113665E−03 | 4.907588250E−03 |
| B5  | 3.710340621E−04 | 1.115071662E−03 |
| B6  | −1.072789356E−03 | −3.344862971E−04 |
| B7  | 1.570986744E−03 | −9.715759839E−04 |
| B8  | −8.252176837E−04 | 2.117567352E−03 |
| B9  | 2.023334916E−04 | −1.181394083E−03 |
| B10 | −1.494283234E−05 | 2.356282869E−04 |

TABLE 9

EXAMPLE 5 SURFACE DATA

| Si | Ri | Di | Ndj | ν dj |
| --- | --- | --- | --- | --- |
| 1 | −19.8809 | 0.900 | 1.48749 | 70.2 |
| 2 | 4.0158 | 4.939 | | |
| 3(APERTURE STOP) | ∞ | 0.202 | | |
| 4 | 4.5092 | 2.914 | 1.88300 | 40.8 |
| 5 | −26.1775 | 0.567 | | |
| 6 | −8.7832 | 0.700 | 1.92286 | 18.9 |
| 7 | 5.9625 | 0.204 | | |
| 8 * | 4.0404 | 2.000 | 1.80348 | 40.4 |
| 9 * | −16.4640 | 4.193 | | |
| 10 | ∞ | 0.400 | 1.51680 | 64.2 |
| 11 | ∞ | 0.500 | | |

TABLE 10

EXAMPLE 5 ASPHERICAL SURFACE DATA

|     | S8              | S9              |
| --- | --------------- | --------------- |
| C   | 2.474993399E−01 | −6.073847948E−02 |
| KA  | 2.649144471E+00 | 1.983468751E+01 |
| B3  | −4.652144836E−03 | −1.919688115E−03 |
| B4  | 9.895083359E−03 | 3.321459082E−03 |
| B5  | −2.276779822E−02 | 1.305029618E−02 |
| B6  | 9.953513298E−03 | −1.689461530E−02 |
| B7  | 8.074522583E−03 | 8.162432445E−03 |
| B8  | −1.171582453E−02 | −1.049080871E−04 |
| B9  | 5.106903139E−03 | −1.050520151E−03 |
| B10 | −8.141031646E−04 | 2.189556070E−04 |

TABLE 11

EXAMPLE 6 SURFACE DATA

| Si | Ri | Di | Ndj | ν dj |
| --- | --- | --- | --- | --- |
| 1 | −200.0000 | 0.900 | 1.48749 | 70.2 |
| 2 | 2.5907 | 2.792 | | |
| 3(APERTURE STOP) | ∞ | 2.187 | | |
| 4 * | 8.0847 | 3.000 | 1.86400 | 40.6 |
| 5 * | −5.7337 | 0.571 | | |
| 6 | −15.1508 | 1.500 | 1.92286 | 18.9 |
| 7 | 7.3593 | 2.000 | 1.51823 | 59.0 |
| 8 | −6.5795 | 5.556 | | |
| 9 | ∞ | 0.450 | 1.51680 | 64.2 |
| 10 | ∞ | 0.500 | | |

TABLE 12

EXAMPLE 6 ASPHERICAL SURFACE DATA

|     | S4              | S5              |
| --- | --------------- | --------------- |
| C   | 1.236910023E−01 | −1.744079772E−01 |
| KA  | −3.343613620E+00 | −8.647964969E+00 |
| B3  | −4.232696615E−03 | −8.152648161E−04 |
| B4  | 7.072232873E−03 | −6.695362870E−03 |
| B5  | −3.018643254E−03 | 4.426437184E−03 |
| B6  | −6.424876160E−04 | −5.336337911E−04 |
| B7  | 1.622824097E−03 | −1.429284868E−03 |
| B8  | −7.962610231E−04 | 1.181065962E−03 |
| B9  | 1.756520284E−04 | −3.688260630E−04 |
| B10 | −1.474234856E−05 | 4.324574741E−05 |

TABLE 13

EXAMPLE 7 SURFACE DATA

| Si | Ri | Di | Ndj | ν dj |
| --- | --- | --- | --- | --- |
| 1 * | −130.9654 | 0.900 | 1.53391 | 56.0 |
| 2 * | 4.0913 | 5.754 | | |
| 3 * | 6.3710 | 2.998 | 1.69098 | 53.0 |
| 4 * | −4.8659 | 0.300 | | |
| 5(APERTURE STOP) | ∞ | 1.146 | | |
| 6 * | −1.7536 | 0.701 | 1.61400 | 25.5 |
| 7 * | 10.0777 | 0.201 | | |
| 8 * | 2.0947 | 2.003 | 1.53391 | 56.0 |
| 9 * | −6.3120 | 4.529 | | |
| 10 | ∞ | 0.400 | 1.51680 | 64.2 |
| 11 | ∞ | 0.500 | | |

TABLE 14

EXAMPLE 7 ASPHERICAL SURFACE DATA

|     | S1              | S2              | S3              | S4              |
| --- | --------------- | --------------- | --------------- | --------------- |
| C   | −7.635603395E−03 | 2.444232724E−01 | 1.569600812E−01 | −2.055106852E−01 |
| KA  | 1.224949206E+01 | 1.173582692E+00 | 1.337688692E+00 | −9.193045329E+00 |
| B3  | 1.526265682E−03 | 8.544867933E−04 | 7.196676139E−04 | −1.952368044E−03 |
| B4  | −5.762155848E−04 | −1.361274811E−03 | 4.659104945E−04 | 8.297910622E−04 |
| B5  | −1.048103068E−04 | −1.073210421E−04 | 1.906096660E−03 | −9.117172982E−04 |
| B6  | 6.733293619E−06 | −9.449471460E−05 | −2.488314570E−05 | −4.875147023E−04 |
| B7  | −2.897881203E−06 | −4.620313625E−05 | −1.243661461E−03 | −9.765409396E−05 |

TABLE 14-continued

EXAMPLE 7 ASPHERICAL SURFACE DATA

| | | | | |
|---|---|---|---|---|
| B8 | −6.916478223E−06 | −2.856472150E−06 | 8.312049474E−04 | 1.042960258E−03 |
| B9 | 3.089912617E−06 | 1.567066824E−05 | −2.055739185E−04 | −7.046466571E−04 |
| B10 | −4.554195101E−07 | −5.747018278E−06 | 1.260958786E−05 | 1.331407267E−04 |

| | S6 | S7 | S8 | S9 |
|---|---|---|---|---|
| C | −5.702457830E−01 | 9.922873248E−02 | 4.773873287E−01 | −1.584283981E−01 |
| KA | −4.990724630E+00 | 4.856675263E+00 | −6.015090716E+00 | 5.598304644E+00 |
| B3 | 2.479755119E−03 | 2.972737887E−03 | −1.359796507E−03 | 1.464976416E−03 |
| B4 | −1.775624250E−04 | −2.373308829E−03 | 2.153250397E−03 | 5.371762594E−03 |
| B5 | −2.547610774E−03 | −3.327155786E−03 | 1.258453685E−03 | 9.222639365E−04 |
| B6 | −3.595799712E−03 | −3.600846094E−04 | −1.579655091E−04 | 1.008149623E−03 |
| B7 | 1.129350865E−03 | −4.086137953E−04 | −2.814442015E−04 | −3.544860943E−04 |
| B8 | 9.279722127E−04 | −2.920674380E−04 | −1.963489928E−04 | 2.275811782E−04 |
| B9 | −1.257936373E−03 | 4.361280167E−05 | 1.085288852E−04 | −1.322513352E−04 |
| B10 | 3.593368878E−04 | 4.188369970E−05 | −3.544283044E−05 | 1.587394636E−05 |

TABLE 15

EXAMPLE 8 SURFACE DATA

| Si | Ri | Di | Ndj | ν dj |
|---|---|---|---|---|
| 1 | −34.6341 | 0.900 | 1.58913 | 61.2 |
| 2 | 4.2660 | 6.138 | | |
| 3 * | 5.0000 | 3.000 | 1.69098 | 53.0 |
| 4 * | −4.0522 | 0.300 | | |
| 5(APERTURE STOP) | ∞ | 0.795 | | |
| 6 * | −2.4009 | 0.701 | 1.90200 | 25.1 |
| 7 * | 28.6388 | 0.204 | | |
| 8 * | 2.6133 | 2.000 | 1.56871 | 58.6 |
| 9 * | −13.9652 | 4.263 | | |
| 10 | ∞ | 0.400 | 1.51680 | 64.2 |
| 11 | ∞ | 0.500 | | |

TABLE 16

EXAMPLE 8 ASPHERICAL SURFACE DATA

| | S3 | S4 | S6 | S7 | S8 | S9 |
|---|---|---|---|---|---|---|
| C | 2.000000982E−01 | −2.467772560E−01 | −4.165061369E−01 | 3.491760882E−02 | 3.826593547E−01 | −7.160671601E−02 |
| KA | 2.090048873E+00 | −8.084144177E+00 | −1.049982520E+01 | 5.834498305E+00 | −1.137885686E+01 | −7.455881899E+00 |
| B3 | −2.323335561E−03 | −3.083401865E−04 | 1.688631155E−02 | 2.341363346E−02 | 2.725499570E−02 | −6.221806273E−05 |
| B4 | −6.301641110E−04 | 7.763698367E−04 | 1.390437699E−02 | 1.759286784E−02 | −3.395842615E−02 | 1.726781867E−04 |
| B5 | 1.912373607E−03 | −1.603662580E−05 | −2.184487232E−03 | −2.925732074E−02 | −1.734550860E−03 | −5.571879143E−03 |
| B6 | −4.072590134E−03 | −1.563158314E−04 | −7.967061260E−03 | 1.359371623E−02 | 6.078849277E−03 | 1.300304196E−04 |
| B7 | 2.661863379E−03 | −1.667354622E−03 | 2.007113083E−03 | 4.697827200E−06 | −1.837846000E−05 | 1.631752167E−03 |
| B8 | −9.179443708E−04 | 1.791291698E−03 | 4.056144801E−03 | −1.994308700E−04 | −2.074567300E−07 | 7.128724139E−04 |
| B9 | 1.614233987E−04 | −6.655921930E−04 | −2.349932846E−03 | 7.727329100E−05 | −1.399764000E−05 | −1.122540384E−03 |
| B10 | −1.179159350E−05 | 8.698600843E−05 | 3.546399711E−04 | −1.440034800E−05 | 7.068194500E−06 | 2.832559574E−04 |

TABLE 17

EXAMPLE 9 SURFACE DATA

| Si | Ri | Di | Ndj | ν dj |
|---|---|---|---|---|
| 1 | −200.0000 | 0.900 | 1.58913 | 61.2 |
| 2 | 3.0356 | 5.027 | | |
| 3(APERTURE STOP) | ∞ | 0.234 | | |
| 4 * | 5.8064 | 3.000 | 1.86400 | 40.6 |
| 5 * | −7.0066 | 0.578 | | |

TABLE 17-continued

EXAMPLE 9 SURFACE DATA

| Si | Ri | Di | Ndj | ν dj |
|---|---|---|---|---|
| 6 | −12.6813 | 0.761 | 1.92286 | 18.9 |
| 7 | 6.1165 | 0.217 | | |
| 8 | 9.3880 | 2.000 | 1.62299 | 58.2 |
| 9 | −6.4585 | 5.847 | | |
| 10 | ∞ | 0.450 | 1.51680 | 64.2 |
| 11 | ∞ | 0.500 | | |

TABLE 18

EXAMPLE 9 ASPHERICAL SURFACE DATA

| | S4 | S5 |
|---|---|---|
| C | 1.722233689E−01 | −1.427223275E−01 |
| KA | 8.423177372E−01 | −1.733952824E+00 |
| B3 | −1.520154484E−03 | 9.823966293E−05 |
| B4 | 2.662519750E−03 | 3.370229172E−04 |
| B5 | −9.758866928E−04 | 1.893714011E−03 |
| B6 | −9.519067904E−04 | 2.972914701E−04 |
| B7 | 1.245454952E−03 | −1.431260743E−03 |
| B8 | −5.159403747E−04 | 9.742702943E−04 |
| B9 | 9.677178223E−05 | −2.866958559E−04 |
| B10 | −6.158874156E−06 | 3.596274216E−05 |

Focal length f of the entire lens system of image pickup lens in each of Examples 1 to 9, focal length f1 of first lens L1, and values corresponding to Conditional Expressions (1) to (6) are shown in Table 19. The values shown in Table 19 are those with respect to d-line. Each of Examples 1 to 9 satisfies Conditional Expressions (1) to (6).

TABLE 19

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| f | 4.45 | 4.45 | 4.45 | 4.45 | 4.45 | 4.41 | 4.44 | 4.44 | 4.44 |
| f1 | −7.25 | −7.72 | −4.17 | −3.97 | −6.77 | −5.24 | −7.41 | −6.39 | −5.07 |
| (1) Nd2 | 1.69098 | 1.69098 | 1.88300 | 1.88300 | 1.88300 | 1.86400 | 1.69098 | 1.69098 | 1.86400 |
| (3) f1/f | −1.63 | −1.74 | −0.94 | −0.89 | −1.52 | −1.19 | −1.67 | −1.44 | −1.14 |
| (4) vd1 | 61.2 | 61.2 | 53.0 | 61.2 | 70.2 | 70.2 | 56.0 | 61.2 | 61.2 |
| (5) D12/f | 1.41 | 1.37 | 0.71 | 0.56 | 1.15 | 1.13 | 1.29 | 1.38 | 1.18 |
| (6) vd3 | 25.5 | 25.5 | 18.9 | 18.9 | 18.9 | 18.9 | 25.5 | 25.1 | 18.9 |

Tables 1 to 19 include numerical values rounded to a predetermined number of significant digits. As the unit for lengths, "mm" is used. But, this is only an example, and other appropriate units may also be used since identical optical performance may be obtained from an optical system when it is proportionally enlarged or reduced.

Respective aberrations of image pickup lens of each of Examples 1 to 9 are shown in FIGS. 10A to 10D, 11A to 11D, 12A to 12D, 13A to 13D, 14A to 14D, 15A to 15D, 16A to 16D, 17A to 17D, and 18A to 18D respectively.

Here, description will be made by taking the aberration diagrams of Example 1 as example, but aberration diagrams of other Examples are identical to those of Example 1. Diagrams of spherical aberration, astigmatism, distortion, and lateral chromatic aberration of image pickup lens of Example 1 are shown in FIGS. 10A to 10D respectively. The "Fno." in spherical aberration diagram represents an F-number and "ω" in the other diagrams represents a half angle of view. The distortion diagram illustrates an amount of displacement from an ideal image height obtained by f×tan φ, in which f is a focal length of the entire lens system and φ is a half angle of view (treated as a variable, $0 \leq \phi \leq \omega$). Each diagram shows an aberration with e-line (wavelength of 546.07 nm) as the reference wavelength. The diagrams of spherical aberration and lateral chromatic aberration also illustrate aberrations with respect to g-line (wavelength of 436 nm) and C-line (wavelength of 656.27 nm).

As the data suggest, the image pickup lens of each of Examples 1 to 9 is formed of only a small number of four lenses, and can be produced compactly and inexpensively. In addition, each image pickup lens has a small F-number of about 2.0, a wide total angle of view of about 60°, and favorable optical performance with aberrations being satisfactorily corrected. These image pickup lenses may be used preferably in surveillance cameras, vehicle cameras for taking images of front, side, and rear of the vehicles, and the like.

Figure 19:
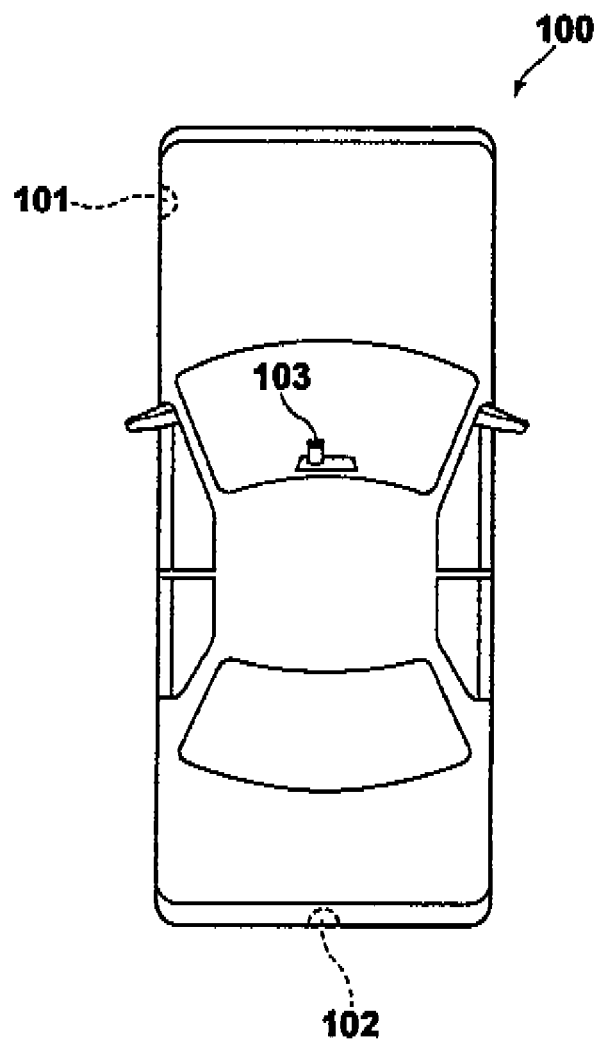
FIG. 19 illustrates location of a vehicle image pickup apparatus according to an embodiment of the present invention.

As a usage example, FIG. 19 illustrates automobile 100 in which an image pickup apparatus having an image pickup lens of the present invention is mounted. In FIG. 19, automobile 100 has vehicle exterior camera 101 for imaging a blind area on the front passenger seat side, vehicle exterior camera 102 for imaging a blind area on the rear side, and in-vehicle camera 103 attached to the rear side of a rearview mirror to image a view range identical to that of a driver. Vehicle exterior camera 101, vehicle exterior camera 102, and in-vehicle camera 103 are image pickup apparatuses according to an embodiment of the present invention, and include image pickup lenses of examples of the present invention and image sensors for converting optical images formed by the image pickup lenses to electrical signals.

So far the present invention has been described by way of embodiments and examples, but the invention is not limited to the embodiments and examples described above and various modifications and changes may be made. For example, values of the radius of curvature, surface distance, refractive index, Abbe number, aspherical coefficient of each lens element are not limited to those shown in each of the numeric value examples and may take other values.

Further, in the embodiment of the image pickup apparatus, the description has been made, with reference to a drawing, of a case in which the present invention is applied to a vehicle camera. But the application of the present invention is not limited to the vehicle camera and the invention may also be applied, for example, to cameras of portable terminal devices, surveillance cameras, and the like.

What is claimed is:

1. An image pickup lens, comprising:
   a four lens configuration in which a bi-concave first lens, a bi-convex second lens, a bi-concave third lens, and a positive fourth lens are disposed in this order from an object side,
   wherein:
   at least one of the first, second, third, and fourth lenses has an aspherical surface on each side,
   the image pickup lens satisfies Conditional Expression (1) given below when a refractive index of the second lens with respect to d-line is taken as Nd2:

$$1.6 < Nd2 \tag{1}$$

and the image pickup lens satisfies Conditional Expression (5) given below when a focal length of the entire lens system is taken as f and a distance between the first and second lenses on an optical axis is taken as D12:

$$0.5 < D12/f < 1.5 \tag{5}$$

2. The image pickup lens of claim 1, wherein the image pickup lens satisfies Conditional Expression (2) given below when radii of curvature of the first lens on the object and image sides are taken as R1 and R2 respectively:

$$R2 < |R1| \tag{2}$$

3. The image pickup lens of claim 1, wherein the image pickup lens satisfies Conditional Expression (3) given below when a focal length of the entire lens system is taken as f and a focal length of the first lens is taken as f1:

$$-2.0 < f1/f < -0.7 \tag{3}$$

4. The image pickup lens of claim 1, wherein the image pickup lens satisfies Conditional Expression (4) given below when an Abbe number of the first lens with respect to d-line is taken as vd1:

$$50 < vd1 \tag{4}$$

5. The image pickup lens of claim 1, wherein the image pickup lens satisfies Conditional Expression (6) given below when an Abbe number of the third lens with respect to d-line is taken as vd3:

$$vd3 < 30 \qquad (6).$$

6. The image pickup lens of claim 1, wherein an aperture is disposed between the first and second lenses.

7. The image pickup lens of claim 1, wherein an aperture is disposed between the second and third lenses.

8. The image pickup lens of claim 1, wherein the third and fourth lenses are cemented together.

9. The image pickup lens of claim 1, wherein the first lens is made of glass.

10. The image pickup lens of claim 1, wherein all of the lenses are made of glass.

11. An image pickup apparatus, comprising the image pickup lens of claim 1.

* * * * *